D. LOFGREN.
PROTECTOR FOR RADIATORS.
APPLICATION FILED MAR. 28, 1916.
1,291,038.
Patented Jan. 14, 1919.
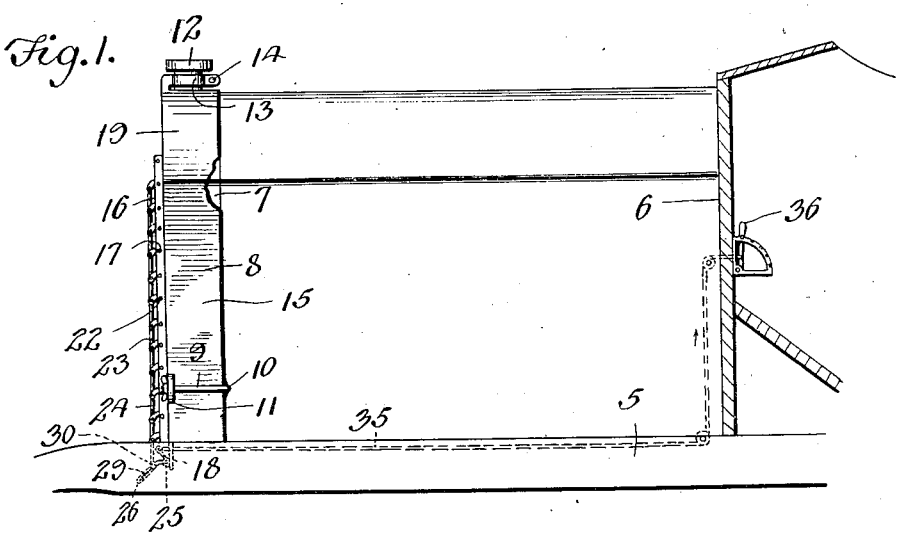
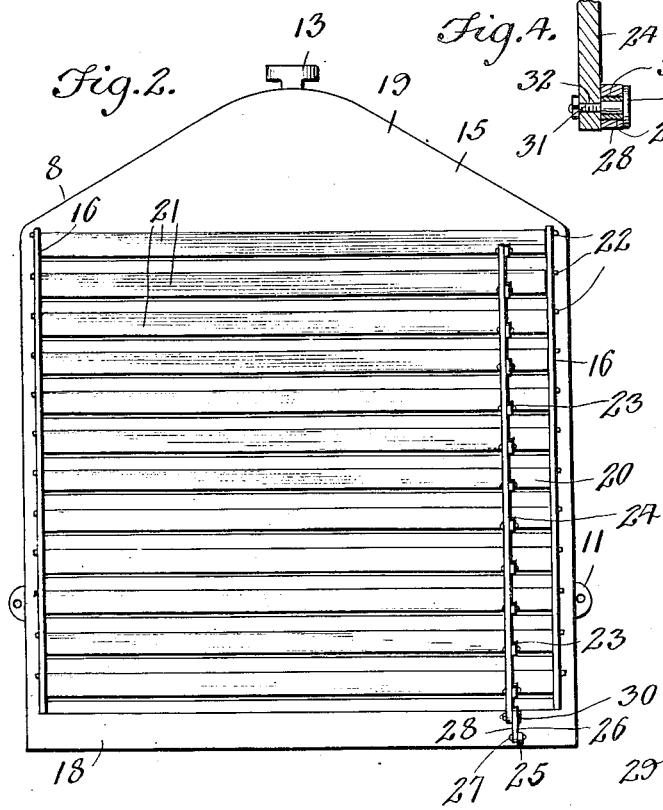
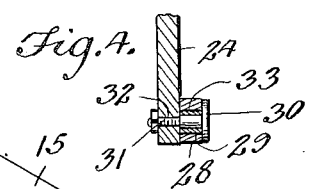
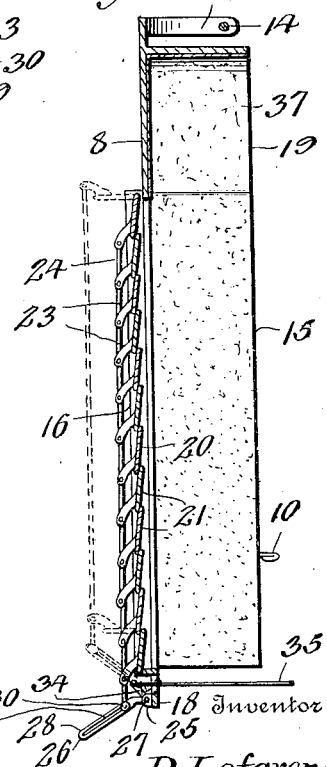

UNITED STATES PATENT OFFICE.

DAVID LOFGREN, OF SIOUX FALLS, SOUTH DAKOTA, ASSIGNOR OF ONE-HALF TO WILLIAM A. SLOAN, OF MINNEHAHA COUNTY, SOUTH DAKOTA.

PROTECTOR FOR RADIATORS.

1,291,038.   Specification of Letters Patent.   Patented Jan. 14, 1919.

Application filed March 28, 1916. Serial No. 87,274.

*To all whom it may concern:*

Be it known that I, DAVID LOFGREN, a citizen of the United States, residing at Sioux Falls, in the county of Minnehaha and State of South Dakota, have invented new and useful Improvements in Protectors for Radiators, of which the following is a specification.

This invention relates to improvements in radiators, for use in connection with automobiles, and more particularly to a protector therefor.

The primary object of the invention is the provision of a device of the above stated character adapted for connection over the front of the automobile radiator, and so constructed as to permit of the admission of cool air within the radiator when the engine is in motion, and guarding against the entrance of the air during cold weather, thereby keeping the water within the radiator from freezing when the engine is stopped and maintaining the radiator in a warm condition.

To this end, use is made of a shield or protector provided with a shutter over the front end thereof, and means having connection with the shutter and extending through the dash of the vehicle in convenient reach of the operator, whereby the driver can readily and quickly and with minimum effort operate the shutter and prevent the water from freezing in cold weather, and further guarding against the radiator from becoming overheated in warm weather.

With the above and other objects in view, the invention consists in the novel features, details of construction, and combination of parts, which will hereinafter be more fully set forth, illustrated in the accompanying drawing, and pointed out in the appended claim.

Figure 1 is a side elevation of the front portion of an automobile, showing the shield in applied position;

Fig. 2 is a front elevation view of the shield removed from the radiator, and illustrating the shutter in a partially open position; and Fig. 3 is a sectional view clearly illustrating the manner of connection of the slats with the operating rod, and the connection of the operating rod with the frame of the protector.

Fig. 4 is a detail sectional view.

In the accompanying drawing, 5 denotes the chassis of an automobile, 6 the dash, and the core of the automobile radiator is designated by the character 7. I provide an improved form of shield or protector 8 for the radiator adapted for connection over the entire front portion of the radiator, and detachably connected thereto through the medium of fastening bolts 9, having their hooked ends 10 engaged with the lower portion of the radiator. These fastening bolts 9 establish a firm connection of the protector 8 to the lower portion of the radiator, while the upper portion of the protector is connected with the cap 12 of the radiator, through the medium of the split band 13. This band is connected with the cap through the medium of a thumb screw 14. This protector constitutes a frame 15 consisting of flanged side members 16 having openings 17 formed therein throughout the length of the same, and the said side members of the frame are connected together at their lower ends by a connecting strip 18, and at their upper extremities by a portion 19, having formed contiguous with the upper terminal thereof the clamping band 13. It is my object in employing a protector and so positioning the same with respect to the radiator of an automobile, to permit of the admission of cool air to the radiator, should the same become overheated during the running of the engine, and further to check the inlet of the air to the radiator during cold weather when the engine is stopped, and to this end, I employ a shutter 20, comprising a series of slats 21. These slats at their opposite extremities, are formed with trunnions 22, journaled in the openings 17 of the flanged side members 16, and adapted for pivotal movement. These slats are disposed transversely of the frame, and for substantially the full vertical extent thereof, and are so mounted within the frame when the shutters are in a closed position, that the same will partially overlap one another, and serve to prevent the admission of air within the radiator. Each of these slats 21 adjacent one terminal thereof is formed with forwardly extending projections 23, arranged in a vertical line with one another, and having pivotally connected to their extremities a rod 24 for causing a simultaneous operation thereof to their respective open or closed positions. Mounted on the connecting strip 18 of the frame, and in vertical alinement with the projections 23, is a bracket 25 having connected therewith for oscillating swinging movement an angular lever 26, through the medium of the pivotal pin 27. This lever 26 is formed with a forwardly and downwardly directed inclined arm 28, having a slot 29 for the reception of a bolt 30. The said bolt 30 is formed with a reduced threaded shank 31, which threadedly engages in the opening 32, formed at the lower extremity of the slat operating rod 24, and carries at its free end a roller 33. The purpose of such roller will be hereinafter more fully described. The arm 34 of the lever 26 has connected therewith an operating rod 35, which extends through the dash 6 of the automobile and in convenient reach of the driver, whereby the same may be readily and quickly operated when so desired. In briefly describing the operation of the invention, it is to be stated that movement of the operating rod 35 in one direction, will cause the lever 26 to rock on its pivot 27, which in turn moves the bolt 30 within the slot 29, and causes the roller 33 of the bolt to revolve, which in turn exerts a vertical pull on the slat operating rod 24, and simultaneously opening the slats 21 to permit of the entrance of air within the radiator, and should it be desired to operate the slats in order that the radiator may be guarded from the entrance of air therein, the operating rod 24 is moved in the reverse direction. The operating rod 35 has connection with the control lever 36, and is positioned within convenient reach of the driver of the machine, as shown, it being understood, of course, that this member 35 termed an operating rod, is of a flexible nature and may be constructed of a single strand of wire or the like material.

Interposed between the front face of the automobile and the rear face of the protector or shield 8 is a sheet of asbestos, designated by the reference character 37, which further assists in excluding the entrance of air within the radiator at the point of contact of the protector with the front face thereof, as will be apparent to those skilled in the art to which the invention relates.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such advantages may be made when desired as are within the scope of the claim appended thereto.

I claim:

A radiator shield comprising a frame adapted for disposition against the front of a radiator, the front wall of said frame being provided with a rectangular opening, outwardly extending flanges formed at the side edges of said opening, a plurality of slats pivoted between said flanges and adapted to be engaged with one another in overlapping relation, a forwardly and downwardly curved projection on each slat, a bracket upon the lower portion of the front of said shield, an angle lever pivoted upon said bracket and having one arm provided with a longitudinal slot, a rod pivotally connected with all of said projections, a transversely disposed roller journaled on the lower end of said rod and disposed within said slot, and means connected with the other arm of said angle lever for moving said slats.

In testimony whereof I affix my signature in presence of two witnesses.

DAVID LOFGREN.

Witnesses:
WM. A. SLOAN,
JOHN H. MARVIN.